UNITED STATES PATENT OFFICE.

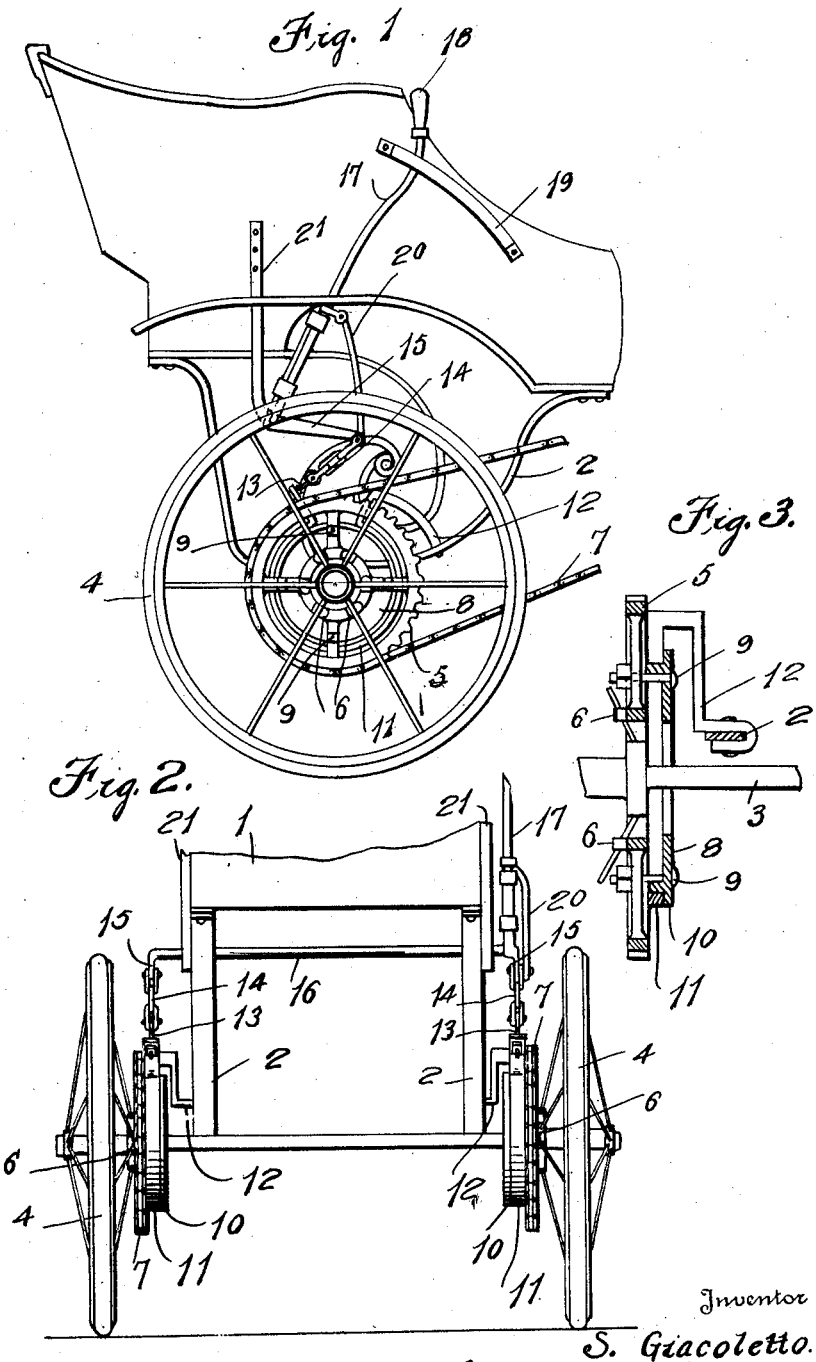

SAVINO GIACOLETTO, OF HANCOCK, MICHIGAN.

BRAKE.

1,345,165.  Specification of Letters Patent.  Patented June 29, 1920.

Application filed September 27, 1917. Serial No. 193,583.

*To all whom it may concern:*

Be it known that I, SAVINO GIACOLETTO, a citizen of the United States, residing at Hancock, in the county of Houghton and State of Michigan, have invented certain new and useful Improvements in Brakes; and I do hereby declare the following to be a full, clear, and exact description of the invention, such as will enable others skilled in the art to which it appertains to make and use the same.

This invention relates to a brake and has for one of its objects the provision of a device of this character whereby the rotation of a wheel may be readily retarded by swinging the controlling lever upon its pivot.

Another object of this invention is the provision of a drum secured to the wheel and having a brake band thereon and which is connected to the operating lever whereby upon swinging said operating lever upon its pivot the band will be caused to grip the periphery of the drum and retard the speed of the wheel.

A still further object of this invention is the provision of a brake of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description and accompanying drawing, in which:—

Figure 1 is a side elevation of a brake constructed in accordance with my invention, Fig. 2 is a rear elevation of the same, and Fig. 3 is a detail sectional view illustrating the means of securing the brake drum to the wheel.

Referring in detail to the drawing, the numeral 1 indicates the body of a vehicle supported by springs 2 which are secured to an axle 3. The axle 3 has journaled thereon wheels 4 to which are secured gear wheels 5 by clamps 6 that surround the spokes of the wheel. The gear wheels 5 have mounted thereon propelling chains 7.

Brake drums 8 are secured to the sprocket wheels 5 by means of bolts 9 and have upstanding flanges 10 formed upon the periphery thereof and which flanges are spaced from the gear wheels.

Brake bands 11 surround the peripheries of the drums 8 between the gear wheels 5 and the flanges 10 and have one of their ends bent and curved and secured to the springs 2 as illustrated at 12, while their opposite ends are disposed at right angles and apertured to receive adjusting bolts 13. The adjusting bolts 13 have connected thereto chains 14 which are in turn secured to arms 15. The arms 15 are formed upon the ends of a rod 16 journaled to the body 2 and are disposed at right angles to the rod.

An operating lever 17 is formed upon one end of the shaft or rod 16 and extends upwardly upon one side of the body 1 and has secured at its uppermost end a hand grip 18. A plate 19 is secured to the body 1 and is provided with a plurality of relatively spaced notches for receiving the lever 17 and holding the same against accidental movement.

In operation, when it is desired to apply the brake, the lever 17 is pulled in the direction of the rear end of the body 1 or into a position as illustrated in full lines in Fig. 1, and the arms 15 move upwardly causing the brake band to tightly grip the peripheries of the brake drums, thus retarding the rotation of the wheels 4. The plate 19 being provided with a plurality of notches provides means whereby the lever 17 may be held at various positions upon the plate to apply the brake to the desired degree.

A brace 20 is secured to the lever 17 and to the free end of the arms 15 for bracing the arms 15 and the lever. Suitable braces 21 are secured to the sides of the body 1 and aid in supporting the shaft 16.

While I have shown and described the preferred embodiment of my invention, it will be understood that minor changes in construction, combination and arrangement of parts may be made without departing from the spirit and scope of the invention as claimed.

Having thus described my invention, what is claimed is:—

1. A vehicle brake comprising the combination with the body, springs and wheels of a vehicle, of a pair of brake drums secured to the vehicle wheels, a pair of brake bands disposed about said brake drums, each brake band having one end thereof turned and secured to the springs of the vehicle, a rotatable rod mounted beneath said body, a supporting member for said rotatable rod carried by said body, arms extended at a right angle from the end of said rotatable rod, adjustable and flexible connections between said arms and the remaining ends of the said brake bands, a lever connected with said rotatable rod to operate the latter, bracing connections between said lever and one of said arms of the rotatable rod, and a guide member for said lever mounted on the body of said vehicle.

2. A vehicle brake comprising the combination with the wheel, body and springs of a vehicle, of a sprocket wheel mounted on each wheel, a brake band clamped upon each sprocket wheel and inwardly of the sprocket wheel and the vehicle wheel, a brake band for each brake drum, one end of each brake band being turned and secured to the springs of said vehicle, a rotatable rod extended transversely beneath said vehicle body, suspending and supporting bracket members depending from said vehicle body, the ends of said rotatable rod being turned at an angle thereto, adjustable and flexible chain connections between the turned ends of said rotatable rod and the remaining ends of said brake bands, and a lever connected with said rotatable rod to operate the latter and adapted for swinging movement along the side of the vehicle body to apply and release the brake bands upon said brake drum.

In testimony whereof I affix my signature in presence of two witnesses.

SAVINO GIACOLETTO.

Witnesses:
MARTIN LINETTI,
JOHN BROCCO.